(12) United States Patent
Hong et al.

(10) Patent No.: US 10,750,234 B2
(45) Date of Patent: Aug. 18, 2020

(54) USER TERMINAL DEVICE AND CONTENT SHARING METHOD THEREOF

(71) Applicant: Samsung Electronics Co., Ltd., Gyeonggi-do (KR)

(72) Inventors: Ray Hong, Seoul (KR); Sahng-hee Bahn, Gyeonggi-do (KR); Chang-hwan Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 418 days.

(21) Appl. No.: 15/193,549

(22) Filed: Jun. 27, 2016

(65) Prior Publication Data

US 2016/0309220 A1    Oct. 20, 2016

Related U.S. Application Data

(63) Continuation of application No. 13/408,518, filed on Feb. 29, 2012, now abandoned.

(30) Foreign Application Priority Data

Oct. 14, 2011  (KR) .................. 10-2011-0105490

(51) Int. Cl.
*H04N 21/472*    (2011.01)
*H04N 21/436*    (2011.01)
(Continued)

(52) U.S. Cl.
CPC ....... *H04N 21/43615* (2013.01); *H04L 67/16* (2013.01); *H04L 67/306* (2013.01);
(Continued)

(58) Field of Classification Search
CPC .............................................. H04N 21/43615
(Continued)

(56) References Cited

U.S. PATENT DOCUMENTS 6,970,145 B1 * 11/2005 Aoki ..................... G06F 3/1431
                                                            345/1.2
7,689,510 B2 * 3/2010 Lamkin ............... G06F 16/4387
                                                            705/51
(Continued)

FOREIGN PATENT DOCUMENTS

CN           1808430        7/2006
EP           1 681 859      7/2006
(Continued)

OTHER PUBLICATIONS

Anura Guruge, "Windows 7: File Transfer Progress Displayed on Task Bar. Wow.", Dec. 26, 2009, 2 pages.
(Continued)

*Primary Examiner* — Nicholas McFall
*Assistant Examiner* — Terri L Filosi
(74) *Attorney, Agent, or Firm* — The Farrell Law Firm, P.C.

(57) ABSTRACT

A display device and a method are provided. The display device includes a network interface connected to a network; an internal storage configured to store at least one content; a display; and a processor configured to control the display to display, in a first area of a user interface (UI) screen, a category list, including a video category and a photo category, to enable selection of one category from the list, and control the display to display, in a second area of the UI screen, at least one thumbnail image corresponding to at least one content stored in at least one external device connected through the network interface and at least one thumbnail image corresponding to the at least one content stored in the internal storage.

20 Claims, 10 Drawing Sheets

(51) Int. Cl.
*H04N 21/433* (2011.01)
*H04N 21/482* (2011.01)
*H04L 29/08* (2006.01)
*H04N 21/81* (2011.01)
*H04M 1/725* (2006.01)

(52) U.S. Cl.
CPC ..... *H04N 21/433* (2013.01); *H04N 21/47202* (2013.01); *H04N 21/4828* (2013.01); *H04N 21/8113* (2013.01); *H04M 1/72527* (2013.01)

(58) Field of Classification Search
USPC .......................................................... 715/739
See application file for complete search history.

(56) References Cited

U.S. PATENT DOCUMENTS

| | | | |
|---|---|---|---|
| 7,774,708 | B2 | 8/2010 | Bell et al. |
| 8,862,623 | B2 | 10/2014 | Ishizuka |
| 2004/0148378 | A1 | 7/2004 | Koide et al. |
| 2005/0041035 | A1* | 2/2005 | Nagatomo ................ G06T 3/40 345/601 |
| 2006/0106793 | A1 | 5/2006 | Liang |
| 2006/0206592 | A1 | 9/2006 | Fujii et al. |
| 2007/0250530 | A1 | 10/2007 | Choi |
| 2008/0168394 | A1 | 7/2008 | Kawasaki |
| 2008/0307314 | A1 | 12/2008 | Cisler et al. |
| 2009/0083642 | A1 | 3/2009 | Kim et al. |
| 2009/0150480 | A1 | 6/2009 | Xia et al. |
| 2009/0248702 | A1 | 10/2009 | Schwartz et al. |
| 2009/0327962 | A1 | 12/2009 | Betts-LaCroix et al. |
| 2010/0023858 | A1* | 1/2010 | Ryu ...................... G06F 3/0416 715/702 |
| 2010/0169778 | A1 | 7/2010 | Mundy et al. |
| 2010/0180209 | A1 | 7/2010 | Yang |
| 2011/0113373 | A1 | 5/2011 | Phang et al. |
| 2011/0119621 | A1* | 5/2011 | Cho .................. H04N 5/44591 715/788 |
| 2011/0126116 | A1 | 5/2011 | Lee et al. |
| 2011/0154213 | A1 | 6/2011 | Wheatley et al. |
| 2011/0179076 | A1 | 7/2011 | Ishizuka |
| 2012/0139945 | A1* | 6/2012 | Choi .................... G06F 3/0346 345/660 |
| 2013/0014150 | A1* | 1/2013 | Seo .................. H04N 21/44222 725/14 |
| 2013/0144855 | A1 | 6/2013 | Kaul et al. |

FOREIGN PATENT DOCUMENTS

| | | |
|---|---|---|
| JP | 2007-306088 | 11/2007 |
| KR | 1020110050527 | 5/2011 |
| KR | 1020110067593 | 6/2011 |
| WO | WO 2011/097739 | 8/2011 |

OTHER PUBLICATIONS

Korean Office Action dated Nov. 28, 2017 issued in counterpart application No. 10-2011-0105490, 11 pages.
Chinese Office Action dated Jan. 3, 2018 issued in counterpart application No. 201280050490.5, 16 pages.
European Intention to Grant dated Dec. 12, 2017 issued in counterpart application No. 12839474.9, 38 pages.
Examination Report dated Feb. 4, 2016 issued in counterpart application No. 12839474.9-1853, 6 pages.
Anonymous: "KinskyWindowsDavaarManual—Linn Open Source Software", XP055193387, Sep. 30, 2011, 14 pages.
European Search Report dated Jun. 12, 2015 issued in counterpart application No. 12839474.9-1853, 9 pages.
Chinese Office Action dated May 2, 2017 issued in counterpart application No. 201280050490.5, 10 pages.
Summons to Attend Oral Proceedings dated Jul. 3, 2017 issued in counterpart application No. 12839474.9-1853, 10 pages.
Examination Report dated Sep. 21, 2016 issued in counterpart application No. 12839474.9-1853, 8 pages.
Chinese Rejection Decision dated Jul. 9, 2018 issued in counterpart application No. 201280050490.5, 11 pages.

* cited by examiner

USER TERMINAL DEVICE AND CONTENT SHARING METHOD THEREOF

PRIORITY

This application is a Continuation of U.S. patent application Ser. No. 13/408,518 filed Feb. 29, 2012, which claims priority under 35 U.S.C. § 119(a) to Patent Application No. 10-2011-0105490, filed on Oct. 14, 2011 in the Korean Intellectual Property Office, the entire disclosure of which is incorporated herein by reference.

BACKGROUND

1. Field of the Invention

The present invention relates generally to a user terminal device and a content-sharing method thereof, and more particularly, to a user terminal device capable of searching for and sharing content locally or via a network and a content-sharing method of the user terminal device.

2. Description of the Related Art

Recent developments in electronic technology have paved the way for the development and commercialization of various types of electronic devices, and, particularly, user terminal devices with improved functionality such as, for example, smartphones, smart TeleVisions (TVs) and the like.

Users connect their user terminal devices and various peripheral devices via a network by using, for example, a Digital Living Network Alliance (DLNA) function, which allows users to share content such as music, photos, videos, and the like between multiple devices.

A device that provides content is referred to as a Digital Media Server (DMS), and a device that renders content provided by a DMS is referred to as a Digital Media Renderer (DMR) or a Digital Media Player (DMP).

A user terminal device equipped with the DLNA function accesses a DMS, and shares content with the DMS. In response to the execution of the DLNA function, the user terminal device loads by searching for content from all devices that are connected to it via a network. Since loading generally takes some time, a user who is relatively unfamiliar with the DLNA function mistakenly terminates the DLNA function before the DLNA function is complete. Additionally, it is generally not easy for the user to select a DMS and a DMR and properly use the DLNA function.

Therefore, there is a need for methods for the user to efficiently use the DLNA function.

SUMMARY

Accordingly, the present invention has been made to solve the above-stated problems occurring in the prior art, and an aspect of the present invention provides a user terminal device capable of effectively sharing content and a content-sharing method of the user terminal device.

According to an aspect of the present disclosure a display device is provided. The display device includes a network interface connected to a network; an internal storage configured to store at least one content; a display; and a processor configured to control the display to display, in a first area of a user interface (UI) screen, a category list, including a video category and a photo category, to enable selection of one category from the list, and control the display to display, in a second area of the UI screen, at least one thumbnail image corresponding to at least one content stored in at least one external device connected through the network interface and at least one thumbnail image corresponding to the at least one content stored in the internal storage, wherein the at least one thumbnail image corresponding to the at least one external device and the at least one thumbnail image corresponding to the at least one content stored in the internal storage are simultaneously displayable on the UI screen.

According to another aspect of the present disclosure, a content-sharing method of a user terminal device, is provided. The method includes connecting, by a network interface of the user terminal device, the user terminal to a network; displaying, by a display of the user terminal device, in a first area of a user interface (UI) screen including a video category and a photo category, to enable selection of a category from the list; and displaying, by the display, in a second area of the UI, at least one thumbnail image corresponding to content stored in at least one external device connected to the user terminal device through the network interface and at least one thumbnail image corresponding to at least one content stored in an internal storage of the user terminal device, wherein the at least one thumbnail image corresponding to the external device and the at least one thumbnail image corresponding to the at least one content stored the internal storage are simultaneously displayable on the UI screen.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
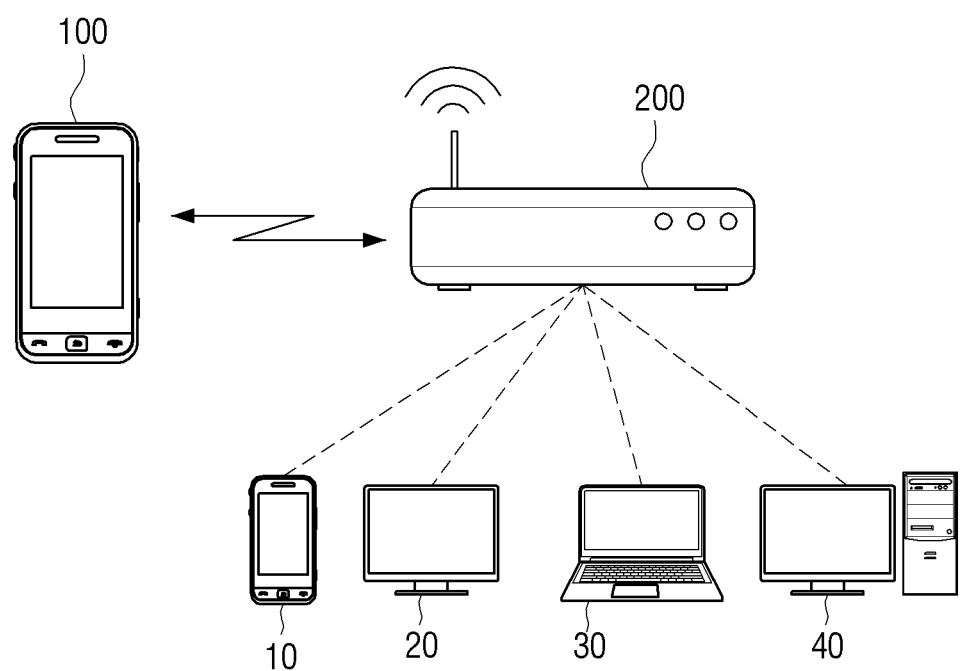
FIG. 1 is a diagram illustrating a content sharing system according to an embodiment of the present invention.

Hereinafter, certain embodiments of the present invention are described in greater detail with reference to the accompanying drawings. Similar components is designated by similar reference numerals although they are illustrated in different drawings. In the following description, a detailed explanation of known related functions and parts is omitted to avoid unnecessarily obscuring the subject matter of the present invention.

FIG. 1 is a diagram illustrating a content sharing system according to an embodiment of the present invention. Referring to FIG. 1, the content sharing system includes a user terminal device 100, an Access Point (AP) 200, and a plurality of devices 10, 20, 30, and 40. The user terminal device 100 and each of the devices 10, 20, 30, and 40 form a network via the AP 200. The user terminal device 100 and the devices 10, 20, 30, and 40 are illustrated in FIG. 1 as connected to one another via the AP 200. Alternatively, the user terminal device 100 and the devices 10, 20, 30, and 40 form a network via other types of relay devices or form a network by being directly connected to one another.

In the case in which a content sharing function is selected, the user terminal device 100 searches for one or more devices that are connected to it via a network, i.e., the devices 10, 20, 30, and 40, via the AP 200. The term 'content sharing function' indicates a function of sharing content between multiple devices and allowing the multiple devices to reproduce the shared content. For example, the content sharing function is a Digital Living Network Alliance (DLNA) function.

The user terminal device 100 operates as a Digital Multimedia Server (DMS) that provides content or as a Digital Multimedia Renderer (DMR) or a Digital Multimedia Player (DMP) that reproduces or plays content provided by other devices. A device that reproduces content will be referred to as a rendering device.

In the case in which a content sharing function is selected, the user terminal device 100 operates in local mode or network mode.

The term "local mode" indicates a mode for providing content present in the user terminal device 100 to a rendering device. In local mode, the user terminal device 100 serves as a DMS. In local mode, the user terminal device 100 is prevented from accessing other DMSs or loading any content information, thus saving time. The operation of the user terminal device 100 in local mode also includes searching through one or more devices that are within a limited range of the user terminal device 100 (for example, one or more devices that are connected to the user terminal device 100 via a local interface).

The term "network mode" indicates a mode in which the user terminal device 100 searches content from its network and provides the identified content to a rendering device. In network mode, the user terminal device 100 requests content information by searching the devices 10, 20, 30, and 40, which are connected to the user terminal device 100 via a network. For example, the user terminal device 100 broadcasts a data request signal via the AP 200. In response to receiving the data request signal via the AP 200, each of the devices 10, 20, 30, and 40 transmits a response signal including device information relating to a corresponding device. The user terminal device 100 accesses each of the devices 10, 20, 30, and 40 based on the device information included in the response signal transmitted by each of the devices 10, 20, 30, and 40, and thus acquires content information. One or more DMSs, among the devices 10, 20, 30, and 40 that are connected to the user terminal device 100 via a network, transmits content information that the DMSs can provide to the user terminal device 100. The user terminal device 100 acquires detailed content information relating to the content based on the information transmitted by the DMSs by using the Simple Object Access Protocol (SOAP). The user terminal device 100 displays the detailed content information and allows a user to select desired content based on the detailed content information. If the user selects content, the user terminal device 100 requests a DMS having the selected content to transmit the selected content to a rendering device. The rendering device is one of devices 10, 20, 30, and 40 that are connected to the user terminal device 100 via a network or the user terminal device 100. If the rendering device is one of the devices 10, 20, 30, and 40, the user terminal device 100 operates as a Digital Multimedia Controller (DMC), and controls the operation of the rendering device. The DMS transmits the selected content to the rendering device by using the HyperText Transfer Protocol (HTTP).

In local mode, the user terminal device 100 cannot perform a browsing function to browse through other devices or a library function to provide a library to other devices, but can perform a rendering function to provide content to a rendering device or control the operation of a rendering device.

The user selects one of the local mode and the network mode. In response to the selection of one of the local mode and the network mode by the user, the user terminal device 100 provides a UI that corresponds to the selected mode while operating in the selected mode.

For example, in response to the selection of an icon for performing a content sharing function, the user terminal device 100 displays a UI that corresponds to whichever of the local mode and the network mode is set as default mode for the content sharing function. If the default mode for the content sharing function is the local mode, the user terminal device 100 searches for content therein and displays the identified content in a local mode UI so that the user selects content from the local mode UI. In response to the selection of content from the local mode UI, the user terminal device 100 displays a list of devices from which a target-rendering device to share the selected content with is selected. Alternatively, the user terminal device 100 reproduces the selected content and then displays the list of devices in response to the user selecting a menu for choosing the target-rendering device while viewing the selected content. In response to the selection of the target-rendering device from the list of devices by the user, the selected content is transmitted to the target-rendering device.

A mode-switching area for switching from one mode to another mode is provided in the local mode UI. The user switches the user terminal device 100 from local mode to network mode by using the mode-switching area in the local mode UI.

When the user terminal device 100 is switched from local mode to network mode, the user terminal device 100 searches for content from the devices 10, 20, 30, and 40, which are all connected to the user terminal device 100 via a network, and displays the found content in a network mode UI. In response to the selection of content in the network mode UI, the user terminal device 100 displays a list of devices from which to select the target-rendering device. In response to the selection of the target-rendering device from the list of devices, the user terminal device 100 transmits a control signal to a DMS to send the selected content to the target-rendering device.

Alternatively, the user terminal device 100 requests the DMS having the selected content to send the selected content. In response to receiving the selected content, the user terminal device 100 reproduces the selected content. In response to the user selecting a particular menu while viewing the selected content, the user terminal device 100 displays a list of devices, and allows the user to select the target-rendering device from the list of devices. In response to the selection of the target-rendering device, the user terminal device 100 directly transmits the selected content to the target-rendering device or transmits a control signal to the DMS having the selected content so that the DMS having the selected content transmits the selected content to the target-rendering device.

The user selects the user terminal device 100 from a list of devices displayed by the user terminal device 100 as the target-rendering device.

A mode-switching area is also provided in the network mode UI. The user switches the user terminal device 100 from the network mode to the local mode by using the mode-switching area in the network mode UI.

In another example, in response to the execution of a content sharing function, the user terminal device 100 displays an initial UI to select one of the local mode and the network mode. In response to the user selecting the local mode from the initial UI, the user terminal device 100 searches for content therein, and displays the identified content in a local mode UI.

In response to the user selecting the network mode from the initial UI, the user terminal device 100 searches its network for content and displays the found content in a network mode UI.

In this example, a mode-switching area for switching the user terminal device 100 from the local mode to the network mode or vice versa is provided in the local mode UI and the network mode UI, respectively.

Alternatively, a menu for returning to the initial UI is provided. The user returns to the initial UI by using this menu, and then switches the user terminal device 100 from the local mode to the network mode or vice versa.

Figure 2:
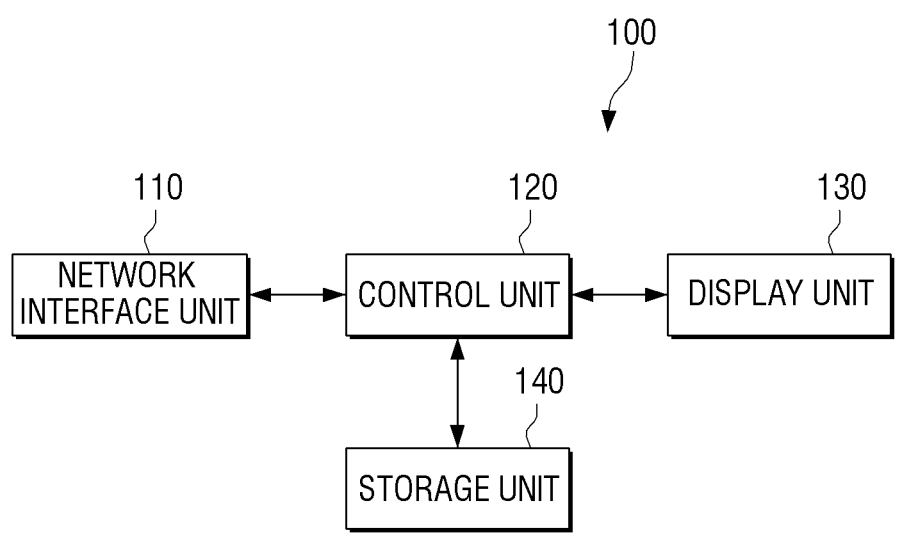
FIG. 2 is a block diagram illustrating a user terminal device according to an embodiment of the present invention.

FIG. 2 is a block diagram illustrating a user terminal device according to an embodiment of the present invention. Referring to FIG. 2, the user terminal device 100 includes a network interface unit 110, a control unit 120, a display unit 130, and a storage unit 140. The network interface unit 110 is connected to a network. For example, the network interface unit 110 is connected to a mobile communication network or a Wireless Fidelity (WiFi®) network by using a mobile communication protocol or a WiFi® protocol.

The storage unit 140 stores content or various programs. For example, various types of multimedia content items such as videos, photos, music, and etc. is stored in the storage unit 140.

The display unit 130 displays various types of UIs under the control of the control unit 120. In the case in which the display unit 130 includes a touchscreen, the user enters a variety of user commands to the user terminal device 100 simply by directly touching a UI on the display unit 130. Alternatively, In the case in which the display unit 130 does not include a touchscreen, the user enters a variety of user commands to the user terminal device 100 by using various keys provided on the main body of the user terminal device 100 or various types of input tools that are connected to the user terminal device 100 such as, for example, a mouse, a keyboard, a joystick and the like.

The control unit 120 performs various functions by controlling the operation of the user terminal device 100 in response to receiving various user commands from the user. In the case in which a content sharing function is selected, the control unit 120 searches for and share content while operating in the local mode or the network mode.

In the case in which the local mode is selected, the control unit 120 searches for content from the storage unit 130 and controls the display unit 130 to display the results of the search in a local mode UI.

In the case in which the network mode is selected, the control unit 120 searches for all the devices that are connected to the user terminal device 100 via a network with the aid of the network interface unit 110, searches for content from the corresponding devices, and controls the display unit 130 to display the search results in a network mode UI.

The local mode UI and the network mode UI each includes a mode-switching area for switching the user terminal device 100 from the local mode to the network mode or vice versa. In response to the manipulation of the mode-switching area, the control unit 120 switches the user terminal device 100 from the local mode to the network mode or vice versa. In the case in which one of the local mode and the network mode is set as the default mode, the control unit 120 controls the display unit 130 to display a UI for whichever of the local mode and the network mode is set as default mode first. Then, in response to a mode switch between the local mode and the network mode, the control unit 120 controls the display unit 130 to display a UI for the local mode or the network mode not set as default mode.

Figure 3:
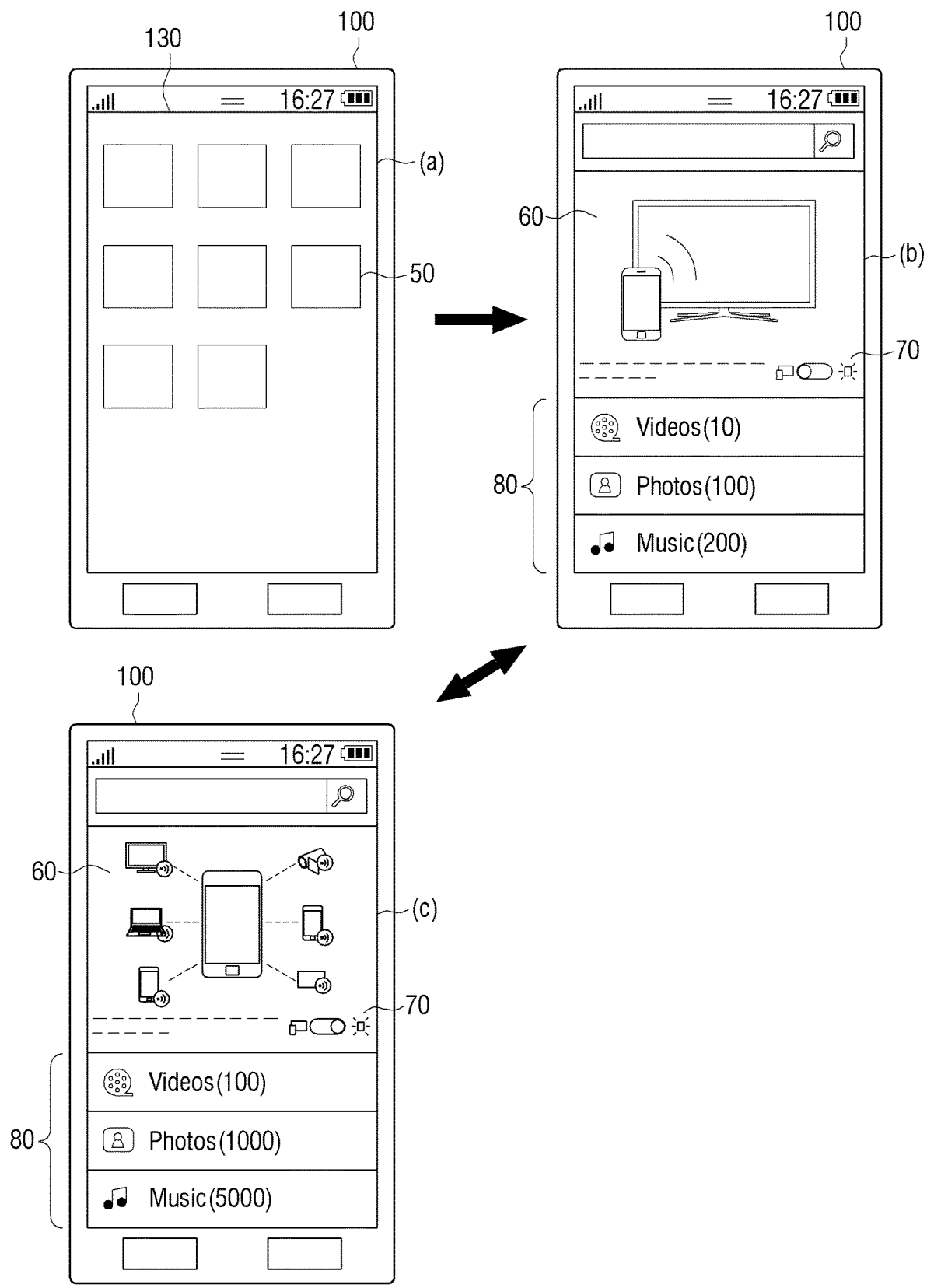
FIG. 3 is a diagram illustrating User Interfaces (UIs) displayed by the user terminal device, according to an embodiment of the present invention.

FIG. 3 is a diagram illustrating a local mode UI, a network mode UI, and a method of switching from the local mode to the network mode in the case in which the local mode is set as default mode, according to an embodiment of the present invention.

Referring to FIG. 3, in response to the selection of an icon 50 for performing a content sharing function when a background screen (a) is displayed on the display unit 130 of the user terminal device 100, the display unit 130 displays a local mode UI (b).

The local mode UI (b) includes an image area 60 in which an image indicating that the user terminal device 100 is in the local mode is displayed, a mode-switching area 70, and an information area 80 in which the number of content items in each content category that are present in the storage unit 140 is displayed.

The mode-switching area 70 includes a bar-shaped section and a sliding switch that is provided in the bar-shaped section. The sliding switch slides within the bar-shaped section in response to being touched or dragged by the user. For example, a first end of the bar-shaped section corresponds to the local mode, and a second end of the bar-shaped section corresponds to the network mode. In this example, the user terminal device 100 is switched to the local mode in response to the sliding switch sliding toward the first end of the bar-shaped section, and is switched to the network mode in response to the sliding switch sliding toward the second end of the bar-shaped section.

The information area 80 displays various content categories. For example, referring to FIG. 3, the information area 80 displays a "Videos" category, a "Photos" category, and a "Music" category. However, there is no restriction as to the types of content categories that is displayed in the information area 80.

In response to the sliding switch sliding toward the second end of the bar-shaped section, the control unit 120 switches the user terminal device 100 to the network mode, and a network mode UI (c) is displayed on the display unit 130.

The network mode UI (c) has the same configuration as the local mode UI (b). That is, the network mode UI (c) includes an image area 60, a mode-switching area 70, and an information area 80. In the image area 60 of the network mode UI (c), an image indicating that the user terminal device 100 is in the network mode is displayed. The information area 80 of the network mode UI (c) displays the total number of content items that are found from the network of the user terminal device 100, and thus provides different content quantities from the information area 80 of the local mode UI (b). In response to the user terminal device 100 being switched to the network mode, the user terminal device 10 searches for content in real time for a predefined amount of time (for example, less than a second) from the devices 10, 20, 30, and 40 that are connected to the user terminal device 100 via a network, and displays the number of content items in each content category that are found from the devices 10, 20, 30, and 40. The counting of content items is performed during or after the search of content from the devices 10, 20, 30, and 40. The information area 80 of the network mode UI (c) displays the total number of content items found from the devices 10, 20, 30, and 40 after the search of content from the devices 10, 20, 30, and 40, or displays the number of content items that are counted as they are found from the devices 10, 20, 30, and 40 in the course of the search of content from the devices 10, 20, 30, and 40. In the latter, the number of content items in each category is displayed in the information area 80 of the network mode UI (c) as incrementally increasing. In the mode switching area 70 of the network mode UI (c), unlike in the mode switching area 70 of the local mode UI (b), a sliding switch is displayed at a side of the mode switching area 70 corresponding to the network mode.

The user chooses one or more content categories to be displayed in the information area 80 of the local mode UI (b) or the network mode UI (c).

Figure 4:
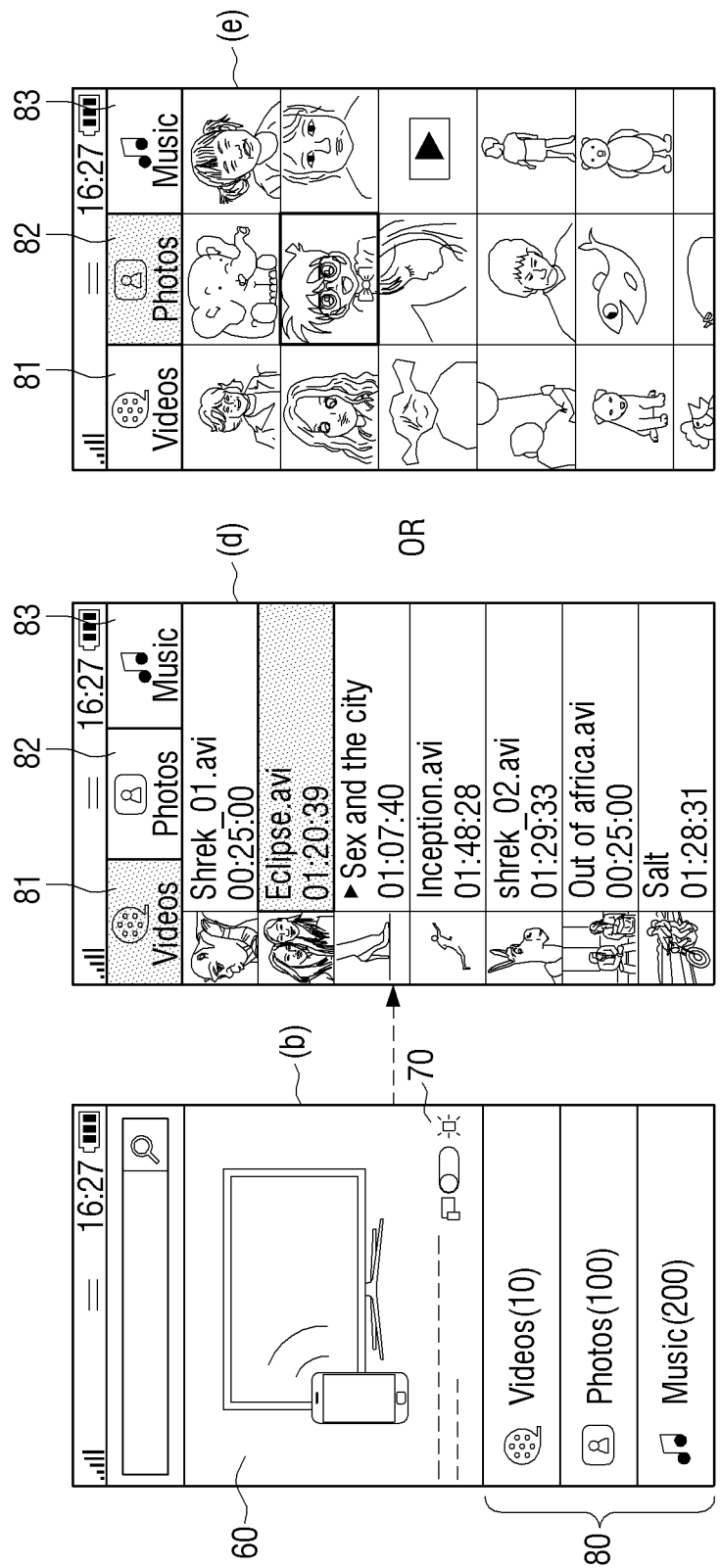
FIG. 4 is a diagram illustrating content search screens using a local mode UI, according to an embodiment of the present invention.

FIG. 4 is a diagram illustrating selecting content using a local mode UI, according to an embodiment of the present invention. Referring to FIG. 4, in response to a content category (for example, a "Videos" category) being selected from an information area 80 of a local mode UI (b), the local mode UI (b) displays information on one or more content items that belong to the "Videos" category as a list or as a thumbnail view. For example, in response to the selection of the "Videos" category or a "Music" category, a list (d) including one or more content items included in the selected category is displayed. Alternatively, in response to the selection of a "Photos" category, a thumbnail view (e) displaying one or more photos included in the "Photos" category is displayed.

The user easily identifies each photo from the thumbnail view (e) without having to see text data. The user easily identifies each video or music content from the list (d) with the aid of text data relating to the title or other identification information of each video or music content. In the example illustrated in FIG. 4, the manner in which content information is displayed varies from one content category to another content category. In another example, content information is uniformly displayed either as a list or as a thumbnail list irrespective of content category.

In the example illustrated in FIG. 4, the list (d) also provides the representative image of each content item. In another example, no representative image is provided for each content item classified into the "Music" category.

A plurality of category tabs 81, 82, and 83 is displayed at the top of the list (d) or at the thumbnail view (e). The user selects one of the category tabs 81, 82, and 83 to view a list of content items or a thumbnail view relevant to the selected category tab. If too many content items are displayed in a list or a thumbnail view, the user is allowed to scroll up and down or left and right in the list or the thumbnail view to identify content information relating to each of the content items.

The user selects a content item from the list (d) or the thumbnail view (e). The control unit 120 reads out the selected content item from the storage unit 140, and plays the read-out content item. To play the read-out content item, one or more additional elements such as, for example, an audio processor for processing an audio signal, a speaker for outputting an audio signal, a video processor for processing a video signal, and the like, are required. However, since these additional elements are well known to one of ordinary skill in the art, detailed descriptions and illustrations of these additional elements will be omitted.

In response to the user selecting a menu in a particular area on the screen of the user terminal device 100 or selecting a particular key on the main body of the user terminal device 100 during the play of the read-out content item, a list of one or more rendering devices from which to select a target-rendering device to share the read-out content item with is displayed. In response to the selection of one of the rendering devices, the control unit 120 transmits the read-out content item to the target-rendering device via the network interface unit 110.

Figure 5:
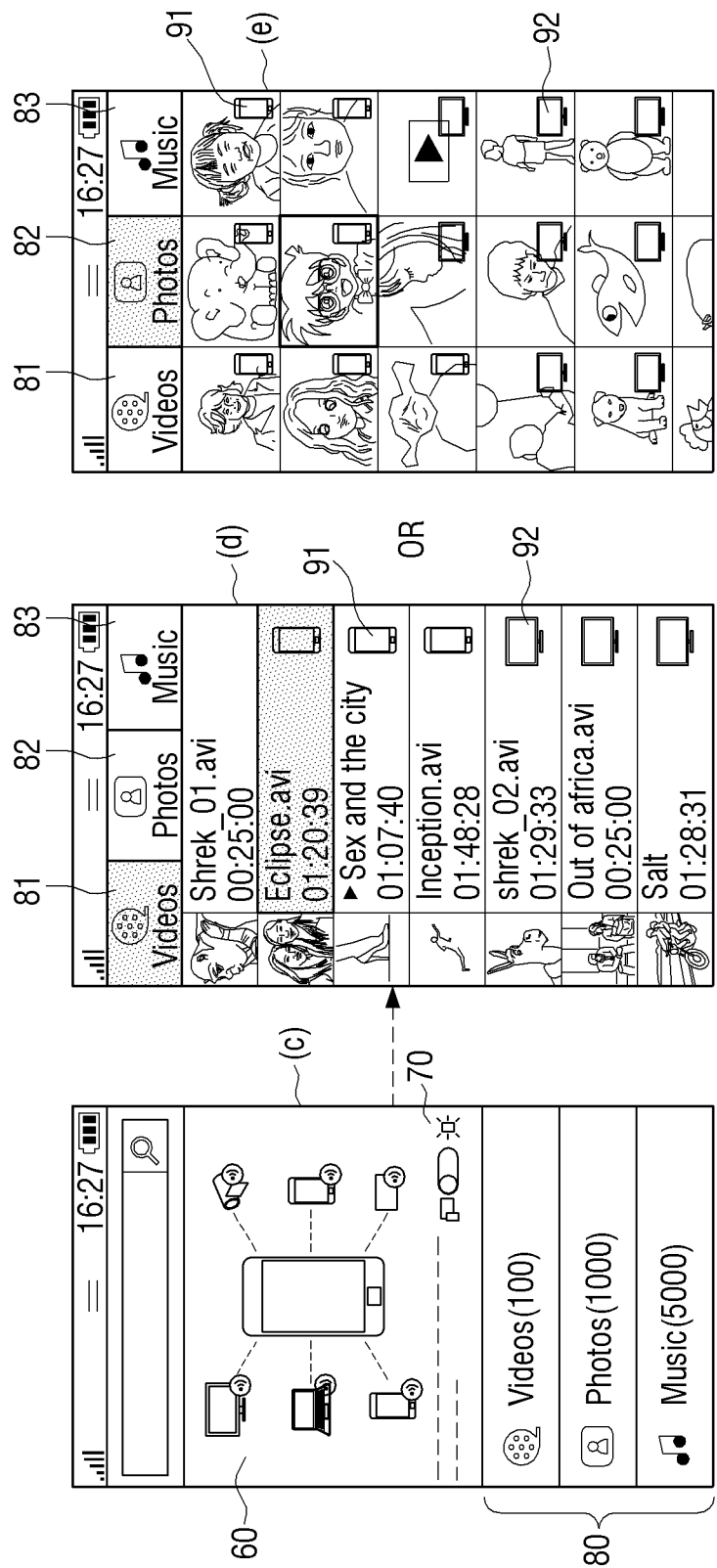
FIG. 5 is a diagram illustrating content search screens using a network mode UI, according to an embodiment of the present invention.

FIG. 5 is a diagram illustrating a method of selecting content using a network mode UI, according to an embodiment of the present invention. Referring to FIG. 5, the user identifies content information relating to each content item in each content category by selecting one of a plurality of content categories displayed in an information area 80 of a network mode UI. The identified content information is displayed as a list (d) or a thumbnail view (e).

In network mode, content is provided by various devices connected to the user terminal device 100 via a network. Thus, to allow the user to easily identify the source of each content item, device icons 91 and 92 are additionally provided on the list (d) or the thumbnail view (e). Various types of icons such as, for example, an icon (i.e., the device icon 91) representing a mobile phone and an icon (i.e., the device icon 92) representing a TV, are displayed on the list (d) or the thumbnail view (e) along with content information relating to each content item.

In response to the selection of a content item from the list (d) or the thumbnail view (e), the user terminal device 100 is provided with the selected content item from a DMS having the selected content item, and plays the selected content item. For example, the control unit 120 issues a request for the selected content item to the DMS. In response to receiving the selected content item from the DMS, the control unit 120 controls the display unit 130 to play the selected content item. In response to the user selecting a menu for selecting a target-rendering device during the play of the selected content item, the control unit 120 controls the display unit 130 to display a list of one or more rendering devices from which to select the target-rendering device. In response to the selection of the target-rendering device, the control unit 120 transmits a control signal to the DMS to request the DMS to transmit the selected content item to the target-rendering device.

Alternatively, the control unit 120 directly transmits the selected content item provided by the DMS to the target-rendering device.

Alternatively, in response to the selection of a content item from the list (d) or the thumbnail view (e), the control unit 120 controls the display unit 130 to display a list of one or more rendering devices from which to select the target-rendering device, and controls the DMS to transmit the selected content item to the target-rendering device.

In the above examples, the user terminal device 100 serves as a DMC in response to the provision of content to the target-rendering device. That is, the control unit 120 controls the display unit 130 to display a control UI for controlling the operation of the target-rendering device. The control UI displays various control menus that are selected or manipulated by the user. In response to the selection of one of the various control menus by the user, the control unit 120 performs various operations such as, for example, playing, stopping, and pausing content, and the like.

In response to the selection of a content item from the list (d) or the thumbnail view (e), the user terminal device 100 is provided with the selected content item from the user terminal device 100 and is provided with the selected content item from a DMS having the selected content item, and plays the selected content item. For example, the control unit 120 issues a request for the selected content item to the DMS. In response to receiving the selected content item from the DMS, the control unit 120 controls the display unit 130 to play the selected content item. In response to the user selecting a menu for selecting the target-rendering device during the play of the selected content item, the control unit 120 controls the display unit 130 to display a list of one or more rendering devices from which to select the target-rendering device. In response to the selection of the target-rendering device, the control unit 120 transmits a control signal to the DMS to request the DMS to transmit the selected content item to the target-rendering device.

In local mode, the user terminal device 100 collects content information relating to each content item that is stored in the storage unit 140.

Alternatively, in network mode, the user terminal device 100 needs to collect content and content information relating to the content from each DMS that is connected to the user terminal device 100 via a network, and displays the collected content and the collected content information in a list or a thumbnail view. The term "content information" includes a representative image, text data, a thumbnail image, and various information such as, for example, the creator of content, and the name of a DMS that provides content. Collecting of content information is referred to as gathering.

In response to a switch from the local mode to the network mode, the control unit 120 generates a DMS content table, generates a network mode UI based on the DMS content table, and provides the network mode UI to the display unit 130. The DMS content table displays various information such as, for example, DMS information, content type information, folder names, file names, and the like. If no new content is found, the user terminal device 100 displays the network mode UI based on previously-loaded content information without the need to perform gathering. Alternatively, if new content is found, the user terminal device 100 needs to perform gathering to collect content information relating to the new content. For example, the new content is gathered from an existing DMS or from a new DMS that is newly added to the network of the user terminal device 100. The control unit 120 performs gathering periodically to collect information necessary for updating.

Since gathering generally takes time, the user often mistakenly determines that the user terminal device 100 is malfunctioning or has stopped operating even when the user terminal device 100 is still performing gathering. Moreover, since it is generally difficult for the user to precisely determine when gathering is complete, the user stops gathering even when gathering is not yet complete.

To address these problems, the control unit 120 displays a Graphic User Interface (GUI) indicating the progress of gathering on the screen of the user terminal device 100 so that the user easily identifies the progress of gathering.

Figure 6:
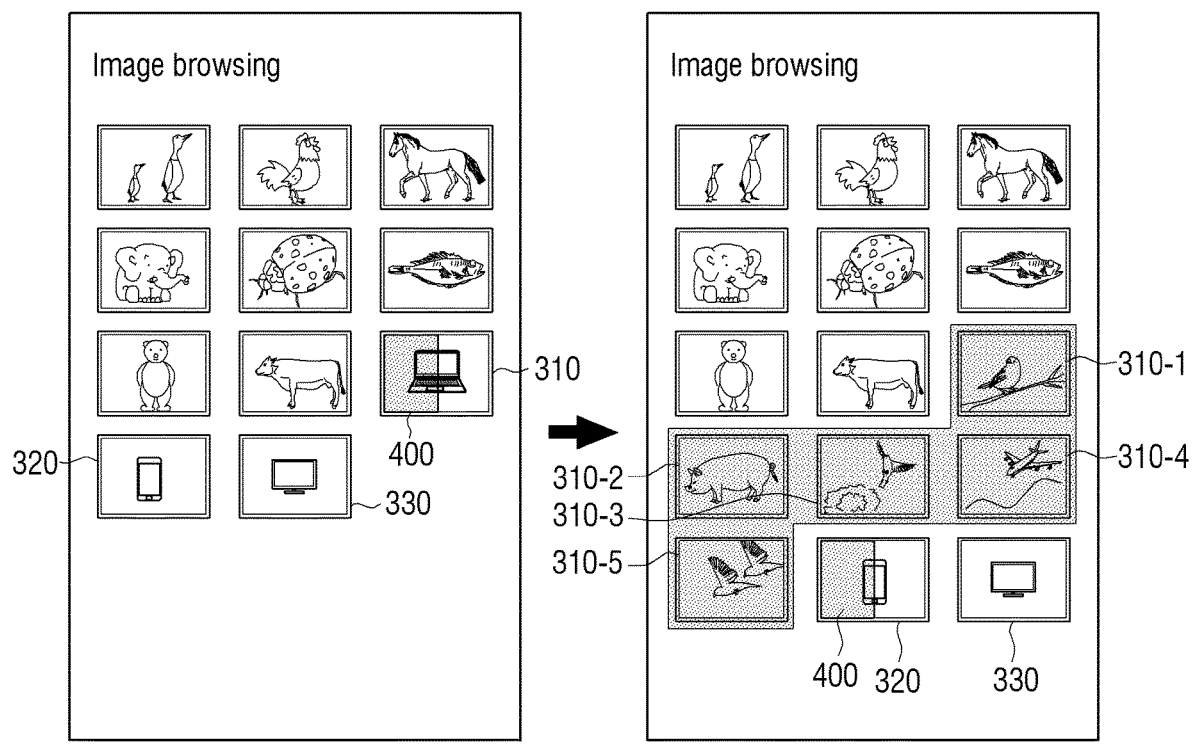
FIG. 6 is a diagram illustrating thumbnail views having added thereto a Graphic UI (GUI) displaying the gathering status of content information, according to an embodiment of the present invention.

FIG. 6 is a diagram illustrating an example of a GUI image that is additionally displayed on a thumbnail view. Referring to FIG. 6, the display unit 130 displays a thumbnail view of one or more previously loaded content items, and also displays device icons 310, 320, and 330 that respectively represent devices each having new content items. A GUI 400 is displayed over a device icon corresponding to a current device on which a gathering operation is being performed, for example, the device icon 310, to indicate the progress of the gathering operation.

In FIG. 6, the GUI 400 is implemented as a progress bar. That is, in another example, the GUI 400 may be implemented as a progress circle that is gradually filled clockwise or counterclockwise as the gathering progresses. Alternatively, in another example, the GUI 400 may be implemented as an image indicating a percentage that expresses the progress of gathering.

When the gathering operation for the current device is complete, the control unit 120 controls the display unit 130 to apply a graphical effect to the device icon corresponding to the current device, i.e., the device icon 310. For example, when the gathering operation for the current device is complete, the display unit 130 displays one or more content icons 310-1 to 310-5, representing one or more content items that is provided by the current device, along with a graphical effect of the device icon 310 exploding and the content icons 310-1 to 310-5 pouring out of the device icon 310. However, there is no restriction on the type of graphical effect that may be applied by the display unit 310.

When gathering for one device is complete, the control unit 120 initiates gathering for another device. That is, the control unit 120 sequentially performs gathering for one device and gathering for another device. Therefore, when gathering for the current device is complete, the control unit 120 displays a GUI 400 over the device icon 320 corresponding to a subsequent device that is subject to gathering after the current device.

Figure 7:
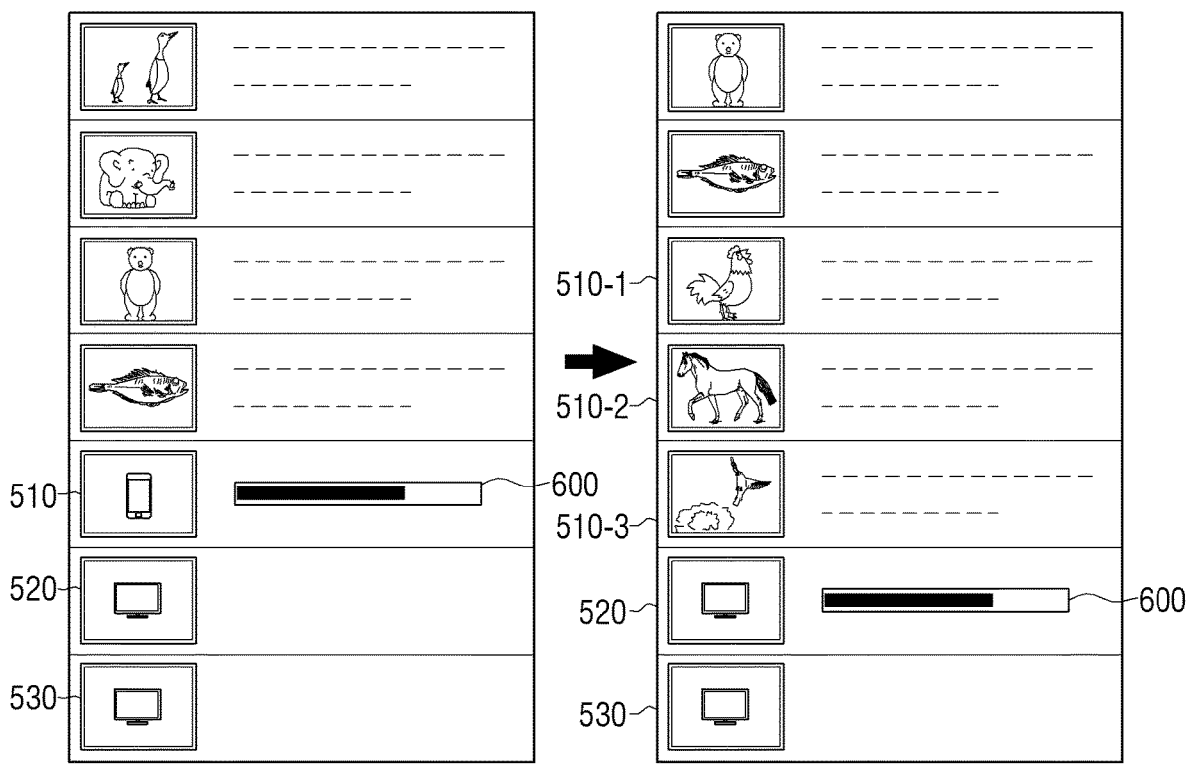
FIG. 7 is a diagram illustrating lists having added thereto a GUI displaying the gathering status of content information, according to an embodiment of the present invention.

FIG. 7 is a diagram illustrating a GUI that is additionally displayed on a list. Referring to FIG. 7, device icons 510, 520, and 530 respectively representing devices each having new content items is displayed at the bottom of a list of content items, and a GUI 600 is displayed next to a device icon corresponding to a current device on which gathering is being performed, i.e., the device icon 510, to indicate the progress of the gathering operation for the current device. When the gathering operation for the current device is complete, the device icon 510 disappears, and a content item 510-1 that is provided by the current device is added to the list, and a GUI 600 is displayed next to the device icon 520 corresponding to the device that is subject to gathering after the current device.

If, during a gathering operation for a particular device, a device icon corresponding to the particular device is touched, the control unit 120 stops the gathering operation. In this example, the control unit 120 is configured to initiate a gathering operation for another device or to perform no gathering any longer.

According to the above-mentioned examples, the user chooses between the local mode and the network mode with convenience. A content sharing function is used to transmit content present in the user terminal device 100 to another device such as, for example, a TV or and to allow the TV to play the content. In this example, since there is no need to search for content from all the devices that are connected to the user terminal device 100 via a network, the user shares the content present in the user terminal device 100 simply by selecting a content item from the user terminal device 100 and selecting a rendering device to share the selected content item with. In the above-mentioned examples, the local mode is set as default mode. In another example, the network mode is set as default mode.

According to the above-mentioned examples, it is possible to provide not only a local-mode UI and a network-mode UI but also an initial mode and allow at least one of the local mode and the network mode to be realized on the initial UI.

Figure 8:
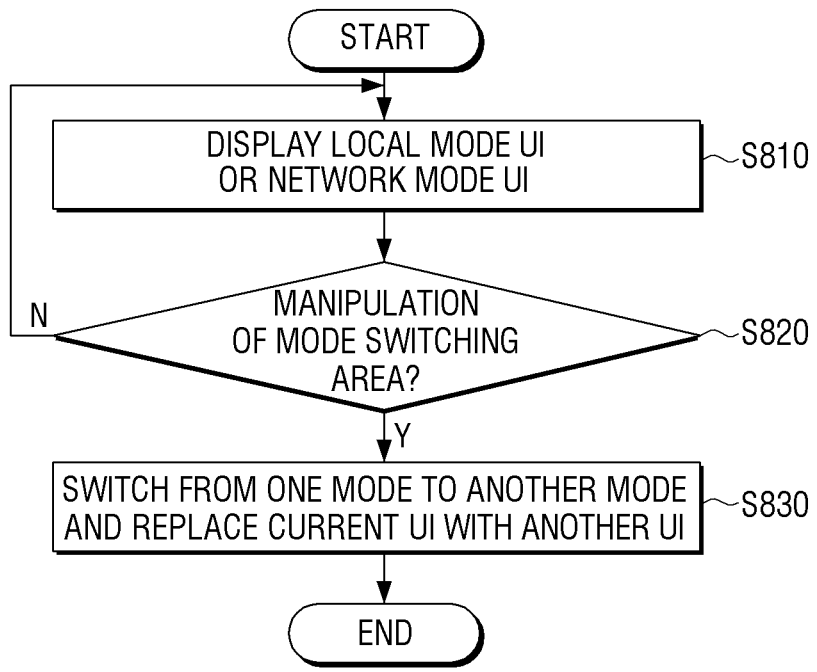
FIG. 8 is a flowchart illustrating a content-sharing method according to an embodiment of the present invention.

FIG. 8 is a flowchart illustrating a content-sharing method according to an embodiment of the present invention. Referring to FIG. 8, in step S810, a local mode UI or a network mode UI is displayed on the screen of a user terminal device. In step S820, in response to the manipulation of a mode-switching area, in step S830, the user terminal device is switched from local mode to network mode or vice versa, and whichever of the local mode UI and the network mode UI is displayed on the screen of the user terminal in step S810 device is changed. For example, if the local mode UI is displayed on the screen of the user terminal device in step S810, the user terminal device is switched to the network mode in response to the manipulation of the mode-switching area. Alternatively, if the network mode UI is displayed on the screen of the user terminal device in step S810, the user terminal device is switched to the local mode in response to the manipulation of the mode-switching area. For example, the mode-switching area is provided on the local mode UI and the network mode UI, respectively, to facilitate the manipulation of the mode-switching area.

The operation of the user terminal device in local mode and the operation of the user terminal device in the network mode have already been described above, and thus, detailed descriptions thereof will be omitted.

Figure 9:
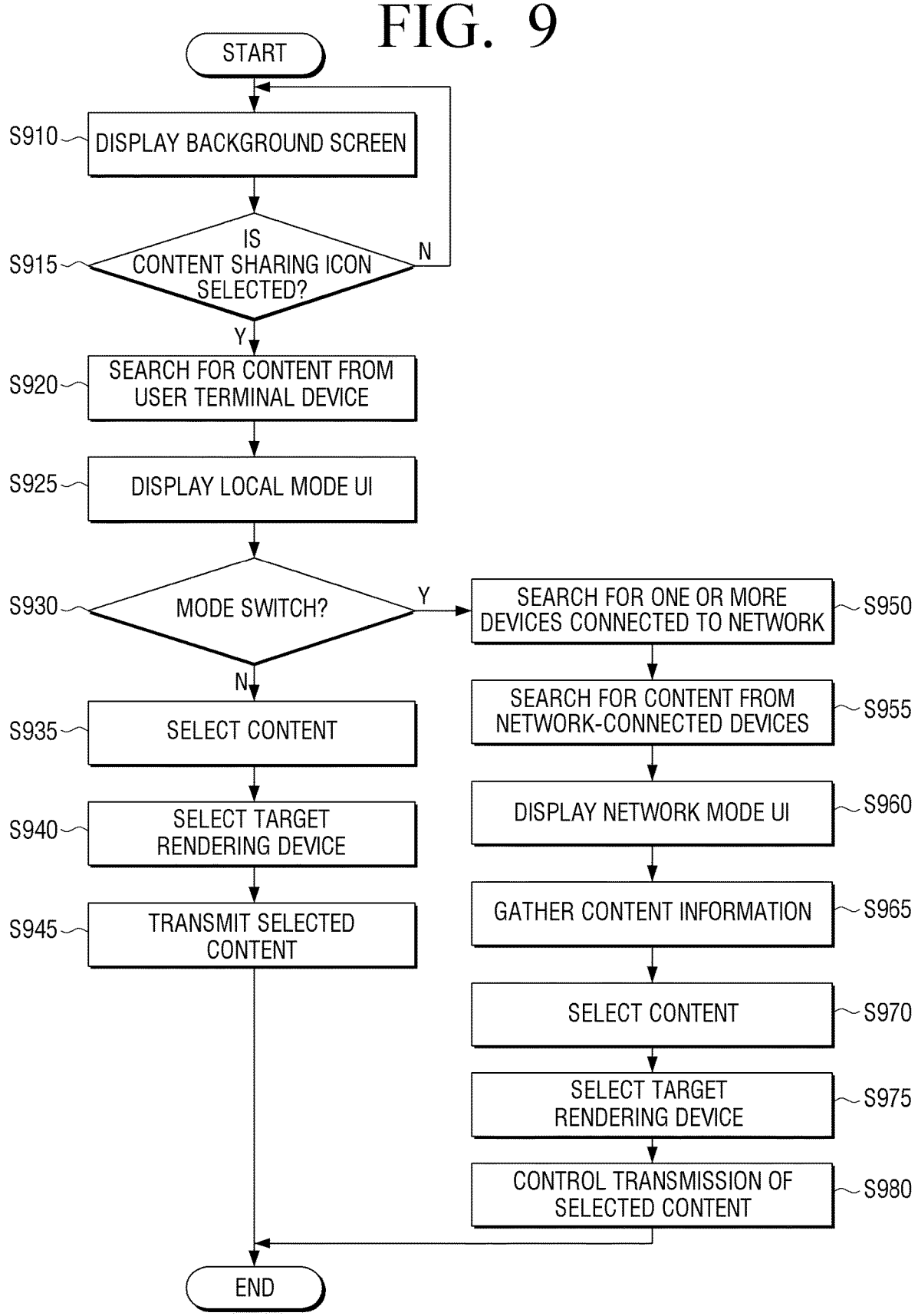
FIG. 9 is a flowchart illustrating a content-sharing method according to another embodiment of the present invention.

FIG. 9 is a flowchart illustrating a content-sharing method according to another embodiment of the present invention. Referring to FIG. 9, in step S910, a background screen is displayed on the screen of a user terminal device. In step S915, in response to a selection of a content sharing icon, in step S920, the user terminal device searches for content present therein the user terminal device in local mode, which is set as default mode. In step S925, a local mode UI is displayed. The local mode UI displays a number of content items that are searched for from the user terminal device in step S920.

A mode-switching area is provided on the local mode UI in step S930. A user switches the user terminal device from the local mode to network mode by manipulating the mode-switching area.

The user terminal device is maintained in the local mode until switched to the network mode in step S930. In step S935, the user selects a content item by using the local mode UI. In step S940, the user also selects a target-rendering device to share the selected content item with by using the local mode UI. In step S945, the user terminal device transmits the selected content item to the target-rendering device.

In step S950, in response to the user terminal device being switched from the local mode to the network mode, one or more devices that are connected to the user terminal device via a network is searched for. In step S955, content is searched for from each of the network-connected devices. In step S960, a network mode UI is displayed. The network mode UI displays the network-connected devices and the content present in each of the network-connected devices.

In step S965, in response to receiving a user command to identify each content item on the network mode UI, the user terminal device performs a gathering operation to collect content information relating to each content item provided by each of the network-connected devices. A GUI indicating the progress of the gathering operation is additionally displayed on a content information list or a thumbnail view.

The content-sharing method illustrated in FIG. 9 includes replacing a device icon corresponding to a device with one or more content icons respectively representing one or more content items provided by the device when a gathering operation for the device is complete while applying a graphical effect to the device icon; and in response to the device icon being touched when the gathering operation for the device is not yet complete, terminating the gathering operation for the device.

In step S970, the user selects a content item from among a number of content items obtained by the gathering operation performed in step S965. In step S975, the user selects a target-rendering device. In step S980, the user terminal device controls the transmission of the selected content item such that the target-rendering device plays the selected content item. The user terminal device is provided with the selected content item from a DMS and provides the selected content item to the target-rendering device. Alternatively, the user terminal device controls the DMS to transmit the selected content item directly to the target-rendering device.

The local mode UI displayed in step S925 and the network mode UI displayed in step S960 both include an information area, as illustrated in FIG. 3. In this example, the content-sharing method illustrated in FIG. 9 includes displaying a list or thumbnail view of one or more content items that are included in a content category selected from the information area, as illustrated in FIGS. 4 and 5. The displaying of a list or thumbnail view of content in response to a selection of a content category from the information area has already been described above with reference to FIGS. 4 and 5, and, thus, a detailed description thereof will be omitted.

The operation of the user terminal device in local mode and the operation of the user terminal device in network mode have already been described with reference to FIGS. 1 to 7, and, thus, detailed descriptions thereof will be omitted.

According to the example illustrated in FIG. 9, it is possible to efficiently perform a content sharing function while preventing unnecessary network access. In this disclosure, the mode for searching for content from a user terminal device or a device that is located within a limited range of the user terminal device and connected to the user terminal device via a local interface is referred to as local mode, and the mode for searching for content from all devices that are connected to the user terminal device via a network is referred to as network mode. The local mode is referred to as a regular mode, and the network mode is referred to as a convergence mode.

Similarly, a content sharing function is referred to as a DLNA function, a convergence function or the like.

Referring back to FIG. 5, the list (d) or the thumbnail view (e) corresponds to an integrated browsing view displaying all content items that are searched for from a network. Alternatively, a per-device browsing view is provided. That is, referring to FIG. 5, in response to the selection of a content category from the information area 80, a list or a thumbnail view of images of and information relating to devices that provide content corresponding to the selected content category is displayed. In this example, the list or the thumbnail view includes tabs respectively corresponding to the devices. Each of the tabs is opened up or closed by a user. In response to one of the tabs being opened up, a list or a thumbnail view of one or more content items that is provided by a device corresponding to the opened-up tab is displayed.

Figure 10:
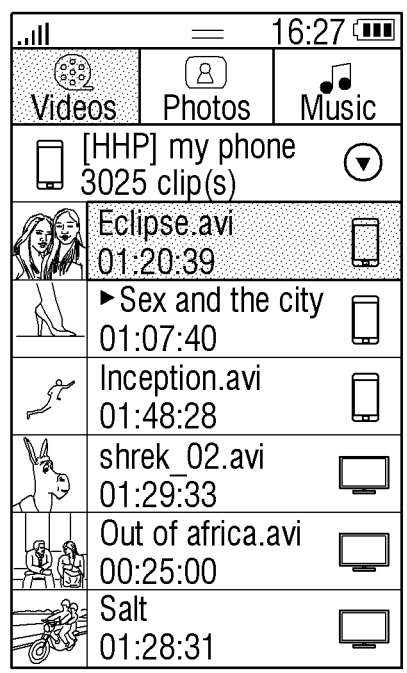
FIG. 10 is a diagram illustrating device browsing view according to an embodiment of the present invention.

FIG. 10 is a diagram illustrating an example of a device browsing view according to an embodiment of the present invention. Referring to FIG. 10, in response to the selection of a tab corresponding to a particular device, a list of one or more content items that is provided by the particular device is displayed. Thus, content is provided via various types of UIs.

The processes, functions, methods, and/or software described herein are recorded, stored, or fixed in one or more computer-readable storage media that includes program instructions to be implemented by a computer to cause a processor to execute or perform the program instructions. The media includes, alone or in combination with the program instructions, data files, data structures, and the like. The media and program instructions are those specially designed and constructed, or they are of the kind well known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as Read-Only Memory (ROM), Random Access Memory (RAM), flash memory, and the like. Examples of program instructions include machine code, such as produced by a compiler, and files containing higher level code that are executed by the computer using an interpreter. The described hardware devices is configured to act as one or more software modules that are recorded, stored, or fixed in one or more computer-readable storage media, in order to perform the operations and methods described above, or vice versa. In addition, a computer-readable storage medium is distributed among computer systems connected through a network and computer-readable codes or program instructions are stored and executed in a decentralized manner.

According to the above-mentioned embodiments, it is possible to readily share content when there is no need to search a whole network. Therefore, it is possible to improve the efficiency of content sharing.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A display device comprising:
a network interface;
an internal storage configured to store at least one content; a display; and
a processor configured to:
control the display to display a local mode user interface (UI) or a network mode UI according to whether the display device operates in a local mode or a network mode, respectively, wherein the local mode UI provides a list of content categories and a first set of content icons, and the network mode UI provides the same list of content categories, at least one external device icon, and at least one content icon, in response to a user selection of the network mode;
receive an indication of new content information regarding at least one content stored in at least one external device via the network interface from each of the at least one external device, and
in response to a user selection of a category from among the same list of content categories:
control the display to display at least one content icon and at least one external device icon corresponding to the at least one external device,
gather content information from the at least one external device,
control the display to display a graphic user interface (GUI) element indicating progress of gathering the content information from the at least one external device while the content information is being gathered, wherein the GUI element is displayed together with the at least one external a-device icon corresponding to the at least one external device, and
control the display to replace, in response to the completed gathering of the content information from the at least one external device, the at least one external device icon with at least one content icon representing the content information gathered from the at least one external device.

2. The device of claim 1, wherein the processor is further configured to:
control the display to display, if a video category is selected via the same list of content categories, at least one thumbnail image corresponding to at least one video content stored in the at least one external device and at least one thumbnail image corresponding to at least one video content stored in the internal storage, and
control the display to display, if the photo category is selected via the same list of content categories, at least one thumbnail image corresponding to at least one photo content stored in the at least one external device and at least one thumbnail image corresponding to at least one photo content stored in the internal storage.

3. The device of claim 1, wherein the at least one external device icon indicates an external device in which content information is stored.

4. The device of claim 1, wherein the same list of content categories includes a music category, and
wherein the processor is configured to control the display to display, if the music category is selected via the same list of content categories, a contents list including information corresponding to at least one music content.

5. The device of claim 1, wherein the processor is further configured to:
determine, after replacing the at least one external device icon with the at least one contenticon representing the content information gathered from the at least one external device, whether at least one additional new content is stored in the at least one external device, and
control, if the at least one additional new content is stored in the at least one external device, the display to display at least one thumbnail image corresponding to at least one additional new content.

6. The device of claim 5, wherein the processor is further configured to periodically determine whether the at least one additional new content is stored in the at least one external device.

7. The device of claim 1, wherein the processor is further configured to control the display to display the at least one rendering device capable of rendering one content being selected.

8. The device of claim 7, wherein the processor is further configured to control the network interface to transmit, if one of the at least one rendering devices is selected, the selected at least one content to the selected rendering device for reproduction of the selected at least one content.

9. The device of claim 8, wherein the processor is further configured to provide a control UI to control reproduction of the selected at least one content at the selected rendering device.

10. The device of claim 7, wherein the processor is further configured to request the at least one external device storing the selected at least one content to transmit the selected content to the selected rendering device.

11. A content-sharing method of a user terminal device, the content-sharing method comprising:
- connecting, by a network interface of the user terminal device, the user terminal to a network;
- controlling a display to display a local mode user interface (UI) or a network mode UI according to whether a display device operates in a local mode or a network mode, respectively, wherein the local mode UI provides a list of content categories and a first set of content icons, and the network mode UI provides the same list of content categories, at least one external device icon, and at least one content icon; and
- in response to a user selection of the network mode;
  - receiving an indication of new content information regarding at least one content stored in at least one external device via the network interface from each of the at least one external device, and
  - in response to a user selection of a category from among the same list of content categories;
    - controlling the display to display at least one content icon and at least one external device icon corresponding to the at least one external device,
    - gathering content information from the at least one external device,
    - controlling the display to display a graphic user interface (GUI) element indicating progress of gathering the content information from the at least one external device while the content information is being gathered wherein the GUI element is displayed together with the at least one external device icon corresponding to the at least one external device, and
    - controlling the display to replace, in response to the completed gathering of the content information from the at least one external device, the at least one external device icon with at least one content icon representing the content information gathered from the at least one external device.

12. The method of claim 11, wherein controlling the display to display the at least one external device icon corresponding to the at least one external device comprises:
- displaying, if a video category is selected via the same list of content categories, at least one thumbnail image corresponding to at least one video content stored in the at least one external device and at least one thumbnail image corresponding to at least one video content stored in an internal storage, and
- displaying, if the photo category is selected via the same list of content categories, at least one thumbnail image corresponding to at least one photo content stored in the at least one external device and at least one thumbnail image corresponding to at least one photo content stored in the internal storage.

13. The method of claim 11, wherein the at least one external device icon indicates an external device in which the content information is stored.

14. The method of claim 11, wherein the same list of content categories includes a music category, and
wherein the method further comprises displaying, if the music category is selected via the same list of content categories, a contents list including information corresponding to at least one music content.

15. The method of claim 11, further comprising:
- determining, after replacing the at least one external device icon with the at least one content icon representing the content information gathered from the at least one external device, whether at least one additional new content is stored in the at least one external device; and
- displaying, if the at least one additional new content is stored in the at least one external device, a UI screen to provide at least one thumbnail image corresponding to the at least one additional new content.

16. The method of claim 15, further comprising periodically determining whether the at least one additional new content is stored in the at least one external device.

17. The method of claim 11, further comprising displaying at least one rendering device capable of rendering one content being selected.

18. The method of claim 17, further comprising controlling the network interface to transmit, if one of the at least one rendering devices is selected, the selected at least one content to the selected rendering device for reproduction of the selected at least one content.

19. The method of claim 18, further comprising providing, a control UI to control reproduction of the selected at least one content at the selected rendering device.

20. The method of claim 17, further comprising requesting the at least one external device storing the selected at least one content to transmit the selected content to the selected rendering device.

* * * * *